United States Patent
Kato et al.

(10) Patent No.: US 7,855,820 B2
(45) Date of Patent: Dec. 21, 2010

(54) OSCILLATOR DEVICE, OPTICAL DEFLECTOR AND OPTICAL INSTRUMENT USING THE SAME

(75) Inventors: Takahisa Kato, Tokyo (JP); Kazutoshi Torashima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/601,924

(22) PCT Filed: Jul. 22, 2008

(86) PCT No.: PCT/JP2008/063487

§ 371 (c)(1),
(2), (4) Date: Nov. 25, 2009

(87) PCT Pub. No.: WO2009/014244

PCT Pub. Date: Jan. 29, 2009

(65) Prior Publication Data

US 2010/0177369 A1  Jul. 15, 2010

(30) Foreign Application Priority Data

Jul. 20, 2007 (JP) ............................. 2007-189446

(51) Int. Cl.
  *G02B 26/08* (2006.01)
(52) U.S. Cl. .................. 359/224.1; 267/154; 359/224.2
(58) Field of Classification Search ... 359/224.1–224.2, 359/290; 267/154; 310/36–37, 66
See application file for complete search history.

(56) References Cited

U.S. PATENT DOCUMENTS

| | | | |
|---|---|---|---|
| 6,327,087 B1 | 12/2001 | Hashimoto et al. | |
| 6,831,765 B2 * | 12/2004 | Yasuda et al. | 359/224.1 |
| 6,900,925 B2 | 5/2005 | Kato et al. | |
| 6,924,914 B2 * | 8/2005 | Kato et al. | 359/199.3 |
| 7,038,834 B2 | 5/2006 | Kato et al. | |
| 7,061,063 B2 | 6/2006 | Kato et al. | |
| 7,220,009 B2 | 5/2007 | Shimada et al. | |
| 7,310,176 B2 | 12/2007 | Kato et al. | |
| 7,355,774 B2 | 4/2008 | Kato et al. | |

(Continued)

FOREIGN PATENT DOCUMENTS

EP  1275997  1/2003

(Continued)

*Primary Examiner*—James Phan
(74) *Attorney, Agent, or Firm*—Fitzpatrick, Cella, Harper & Scinto (57) ABSTRACT

An oscillator device includes a supporting base plate, a torsion spring, and a movable member, wherein the movable member is supported by the torsion spring, for torsional oscillation relative to the supporting base plate about a torsional axis, wherein the torsion spring has an X-shaped section being perpendicular to the torsional axis and a top surface and a bottom surface each being defined by a (100)-equivalent surface of monocrystal silicon, and wherein a distance L1 connecting bottoms of concavities formed at the top surface and bottom surface, respectively, and a distance L2 connecting bottoms of concavities defined at side surfaces of the X-shaped torsion spring as well as a rate of change αi of inertia moment of the movable member around the torsion axis, with a change of a thickness t of the supporting base plate, satisfy the following relation: $L1/L2=C1-\text{Exp}\{C2-(\alpha_i+C3)\}+C4-\alpha_i+C5$ where $C1=5.0*10^{-1}$, $C2=-4.4$, $C3=4.6*10^{-2}$, $C4=-6.0*10^{-1}$ and $1.5<C5<1.7$.

12 Claims, 9 Drawing Sheets

U.S. PATENT DOCUMENTS

| | | |
|---|---|---|
| 7,423,795 B2 | 9/2008 | Kato et al. |
| 7,446,920 B2 | 11/2008 | Kato et al. |
| 7,518,774 B2 | 4/2009 | Kato et al. |
| 7,643,197 B2 | 1/2010 | Kato et al. |
| 2006/0209378 A1 | 9/2006 | Yasuda et al. |
| 2007/0144867 A1 | 6/2007 | Torashima et al. |
| 2007/0279720 A1 | 12/2007 | Torashima et al. |
| 2010/0002277 A1 | 1/2010 | Ushijima et al. |

FOREIGN PATENT DOCUMENTS

| | | |
|---|---|---|
| WO | 2005-063613 | 7/2005 |

* cited by examiner

OSCILLATOR DEVICE, OPTICAL DEFLECTOR AND OPTICAL INSTRUMENT USING THE SAME

TECHNICAL FIELD

This invention relates to an oscillator device having a movable member which is elastically support for torsional oscillation, an optical deflector using the same, and an optical instrument such as an image forming apparatus, for example. This optical deflector may preferably be utilized in a projection display for projecting an image based on scanning deflection of light or an image forming apparatus such as a laser beam printer, a digital copying machine or the like having an electrophotographic process.

BACKGROUND ART

Conventionally, micro-machine members produced from a wafer made of monocrystal silicon through semiconductor processes can be processed by a micrometer order, and thus a wide variety of micro-functional devices haven been realized using the same. Particularly, optical deflectors in which a reflection surface is torsionally oscillated by means of an oscillator device formed by such technique to perform optical scanning, have the following advantageous features as compared with an optical scanning optical system using a rotary polygonal mirror such as a polygon mirror. That is, the optical deflector can be made small in size, and the electric power consumption is slow. Particularly, when it is driven at a frequency around the natural oscillation mode of torsional oscillation of the oscillator device, the power consumption can be made low.

U.S. Pat. No. 7,061,063 discloses a technique for forming a torsion spring of an X-letter shape by performing anisotropic etching to a Si wafer as well as a technique for applying an optical deflector comprising a torsion spring of X-letter shape to an image forming apparatus.

DISCLOSURE OF THE INVENTION

However, when an oscillator device is produced from a wafer by semiconductor processes, if there is dispersion of the wafer thickness, it causes dispersion of the frequency (resonance frequency) of the natural oscillation mode.

The present invention provides an oscillator device by which, even if there is dispersion of the wafer thickness, the drift of the frequency of the natural oscillation mode due to this dispersion can be well suppressed.

In accordance with an aspect of the present invention, there is provided an oscillator device comprising: a supporting base plate; a torsion spring; and a movable member; wherein said movable member is supported by said torsion spring, for torsional oscillation relative to said supporting base plate about a torsional axis; wherein said torsion spring has an X-shaped section being perpendicular to said torsional axis and a top surface and a bottom surface each being defined by a (100)-equivalent surface of monocrystal silicon, and wherein a distance L1 connecting bottoms of concavities formed at the top surface and bottom surface, respectively, and a distance L2 connecting bottoms of concavities defined at side surfaces of the X-shaped torsion spring as well as a rate of change $\alpha_t$ of inertia moment of said movable member around the torsion axis, with a change of a thickness t of said supporting base plate, satisfy the following relation:

$$L1/L2 = C1 \cdot \text{Exp}\{C2 \cdot (\alpha_t + C3)\} + C4 \cdot \alpha_t + C5$$

where $C1 = 5.0 * 10^\wedge -1$ $C2 = -4.4$ $C3 = 4.6 * 10^\wedge -2$ $C4 = -6.0 * 10^\wedge -1$ $1.5 < C5 < 1.7$ In one preferred form of this aspect of the present invention, C5 is equal to 1.6.

The supporting base plate, torsion spring, movable member and concavities may be made from an integral monocrystal silicon material.

The concavities of said torsion spring may have a surface defined by a (111)-equivalent surface.

In accordance with another aspect of the present invention, there is provided an optical deflector, comprising: an oscillator device as recited above; a reflection surface formed on said movable member of said oscillator device, to reflect light; and a driving member configured to drive said movable member relative to said supporting base plate.

In accordance with a further aspect of the present invention, there is provided an oscillator device, comprising: a supporting base plate; and a movable system which includes (i) a first movable member, (ii) a first torsion spring configured to support said first movable member, for torsional oscillation relative to said supporting base plate about a torsion axis and at a first torsional spring constant (K1), (iii) a second movable member, and (iv) a second torsion spring configured to support said second movable member, for torsional oscillation relative to said first movable member about the torsion axis and at a second torsional spring constant (K2); wherein said movable system has a reference oscillation mode corresponding to a natural oscillation mode having a reference frequency, and a secondary oscillation mode corresponding to a natural oscillation mode of a frequency approximately n-fold the reference frequency, where n is an integer; wherein said first and second torsion springs have an X-shaped section being perpendicular to said torsional axis and a top surface and a bottom surface each being defined by a (100)-equivalent surface of monocrystal silicon, and wherein a distance L1 connecting bottoms of concavities formed at the top surface and bottom surface, respectively, of the first torsion spring, a distance L2 connecting bottoms of concavities defined at side surfaces of the X-shaped first torsion spring, a distance M1 connecting bottoms of concavities formed at the top surface and bottom surface, respectively, of the second torsion spring, and a distance M2 connecting bottoms of concavities defined at side surfaces of the X-shaped second torsion spring, as well as rates of change $\alpha_{i1}$ and $\alpha_{i2}$ of inertia moments I1 and I2 of said first and second movable members, respectively, with a change of a thickness t of said supporting base plate, satisfy the following relations:

$$L1/L2 = C1 \cdot \text{Exp}\{C2 \cdot (\alpha_{k1} + C3)\} + C4 \cdot \alpha_{k1} + C5$$

$$M1/M2 = C1 \cdot \text{Exp}\{C2 \cdot (\alpha_{k2} + C3)\} + C4 \cdot \alpha_{k1} + C5$$

$$\alpha_{k1} = Q1 \cdot \alpha_{i1} + Q2 \cdot \alpha_{i2}$$

$$\alpha_{k2} = Q2 \cdot \alpha_{i1} + Q1 \cdot \alpha_{i2}$$

$$Q1 = (I2 \cdot K1 - I1 \cdot K2)/\{I2 \cdot K1 - (I1 + I2) \cdot K2\}$$

$$Q2 = (I2 \cdot K2)/\{(I1 + I2) \cdot K2 - I2 \cdot K1\}$$

where $C1 = 5.0*10^{-1}$ $C2 = -4.4$ $C3 = 4.6*10^{-2}$ $C4 = -6.0*10^{-1}$ $1.5 < C5 < 1.7$ C5 may be equal to 1.6.

The supporting base plate, first torsion spring, second torsion spring, first movable member, and second movable member may be made from an integral monocrystal silicon material.

The concavities of said first and second torsion springs may have a surface defined by a (111)-equivalent surface.

In accordance with a yet further aspect of the present invention, there is provided an optical deflector, comprising: an oscillator device as recited above; a reflection surface formed on at least one of said first and second movable members of said oscillator device, to reflect light; and a driving member configured to drive at least one of said first and second movable members relative to said supporting base plate; wherein said movable system is oscillated simultaneously at the reference oscillation mode and the secondary oscillation mode.

In accordance with a still further aspect of the present invention, there is provided an image forming apparatus, comprising: a light source; an optical deflector as recited above; and a photosensitive member; wherein said optical deflector is configured to deflect light from said light source to project at least a portion of the light onto said photosensitive member, to form an electrostatic latent image thereon.

In accordance with a still further aspect of the present invention, there is provided an image display apparatus, comprising: a light source; and an optical deflector as recited above; wherein said optical deflector is configured to deflect a light beam from said light source to project the light beam onto a member to be irradiated, to form an image thereon.

Briefly, in an oscillator device according to the present invention, the cross-sectional shape perpendicular to the torsion axis is formed into a preferable X-letter shape such as mentioned above, by which the change of the frequency of the natural oscillation mode due to the wafer thickness dispersion is made small.

These and other objects, features and advantages of the present invention will become more apparent upon a consideration of the following description of the preferred embodiments of the present invention taken in conjunction with the accompanying drawings.

BEST MODE FOR PRACTICING THE INVENTION

Preferred embodiments of the present invention will now be described with reference to the attached drawings.

First Embodiment

The present invention in an aspect thereof concerns an oscillator device which includes a movable member, a torsion spring and a supporting base plate, wherein the movable member is supported by the torsion spring for torsional oscillation about a torsion axis, relative to the supporting substrate.

Conventionally, in order to set the resonance frequency of an oscillator device at a predetermined resonance frequency, the inertia moment of the movable member and the spring constant of the torsion spring are used as design values. This is because the resonance frequency of the oscillator device is determined in accordance with the inertia moment of the movable member and the spring constant of the torsion spring.

However, silicon wafers which are the materials for making oscillator devices may have a thickness error which will lead to an error in the inertia moment of the movable member and the spring constant of the torsion spring and cause an error in the resonance frequency of the oscillator device.

In accordance with the present invention, a torsion spring having an X-shaped section is used in the oscillator device and, by making the X-letter shape of this torsion spring into a specific shape to be described later, not at all thought of in the past, reduction of the adverse influence of the wafer thickness error to the resonance frequency is enabled.

Referring now to the drawings, a first embodiment of the present invention will be explained in detail.

Figure 1:
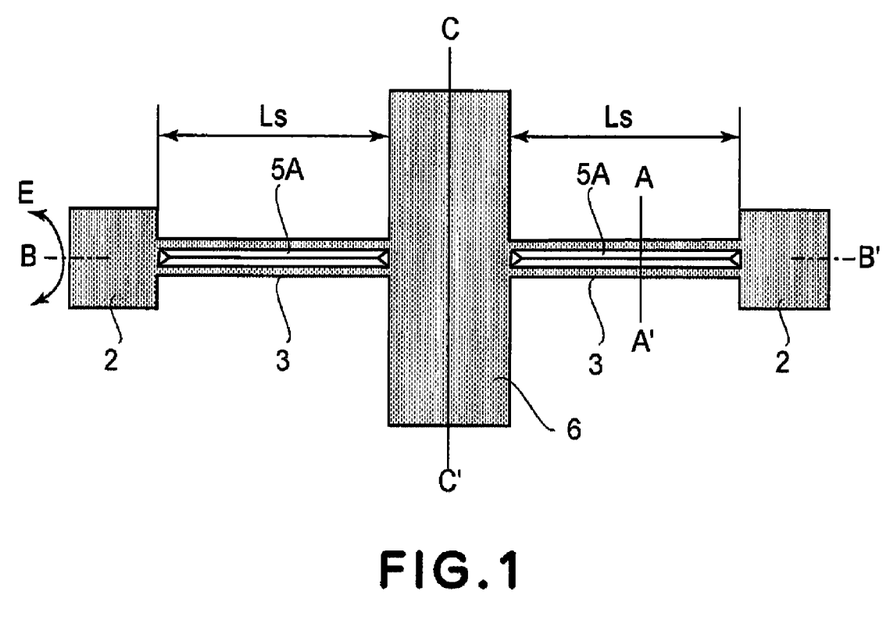
FIG. 1 is a top plan view showing an oscillator device according to a first embodiment of the present invention.

FIG. 1 is a top plan view illustrating the structure of an oscillator device according to the first embodiment of the present invention. In FIG. 1, the oscillator device comprises supporting base plates 2, torsion springs 3 and a movable member 6. The movable member 6 is supported by the torsion springs 3, for torsional oscillation in the direction of an arrow E about a torsion axis (axis B), relative to the supporting base plates 2. The supporting base plate 2 is a member having a function for supporting the torsion spring 3. The torsion springs 3 support the movable member 6, for torsional oscillation relative to the supporting base plates 2 around the torsion axis. Although in FIG. 1 the movable member 6 is supported by two torsion springs 3, in this embodiment the movable member 6 may be supported by a single torsion spring 3. Each torsion spring 3 is formed with a concavity 5A such as shown in FIG. 1. Here, the distance Ls shown in the diagram is taken as the length of the torsion spring 3.

The oscillator device of the first embodiment of the present invention is made from an integral monocrystal silicon material. The integral monocrystal silicon material referred to here means a monocrystal silicon material (wafer) having no cemented interface inside the wafer.

Figure 2:
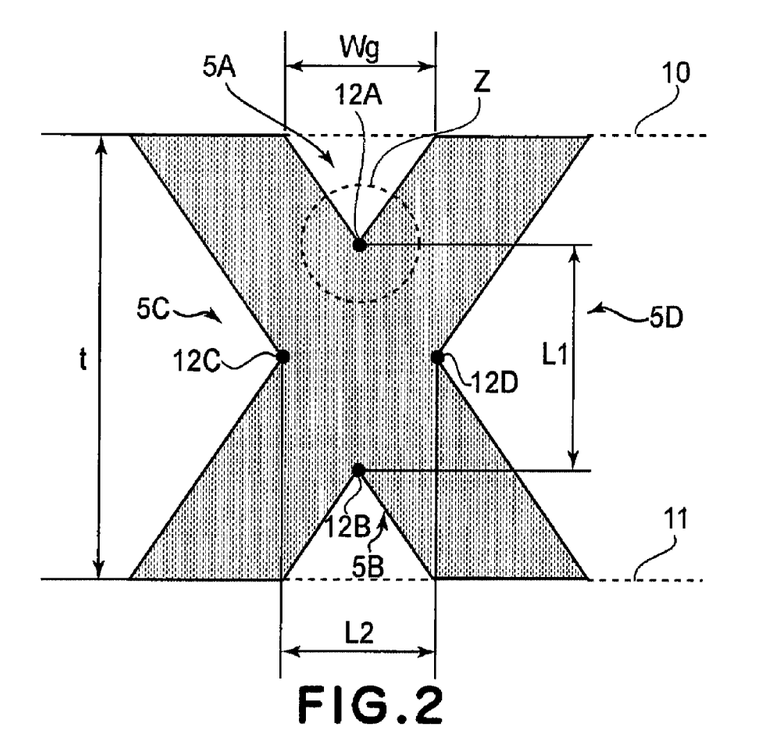
FIG. 2 is a sectional view showing a torsion spring of the present invention.
Figure 3:
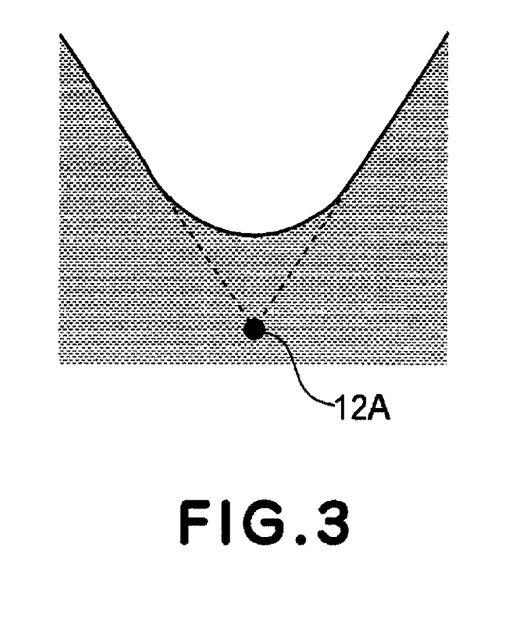
FIG. 3 is an enlarged view of the bottom of a concavity 12A in the present invention.

FIG. 2 is a sectional view of the torsion spring 3 taken on a line A-A' in FIG. 1, along a plane perpendicular to the torsion axis B. As illustrated, the section of the torsion spring 3 has an X-letter shape defined by four concavities 5A, 5B, 5C and 5D formed at top and bottom surfaces and both lateral side surfaces of the torsion spring. The top surface 10 and the bottom surface 11 are comprised of (100)-equivalent surfaces (more specifically, {100}-surfaces) of the monocrystal silicon. The top surface 10 and the bottom surface 11 are formed with a concavity 5A and a concavity 5B, respectively, each extending in the torsion axis B direction and having a V-shaped section. The deepest point (namely, the vertex of V-shaped concavity that forms the X shape) of the concavities 5A and 5B is defined as a bottom 12A or 12B. FIG. 3 is an enlarged diagram of the region Z in FIG. 2. To be exact, the bottom of the concavity may have a curvature radius as illustrated. In this case, the bottom of the concavity may be defined as the point of intersection of extensions of the V-shaped side surfaces of the concavity, as illustrated. The shape having a curvature radius such as shown in FIG. 3 is advantageous in that the stress concentration due to the torsional displacement can be reduced.

Furthermore, there are concavities 5C and 5D as well as bottoms 12C and 12D of these concavities which are formed at positions defined by rotating, by 90 deg., the positional relationship of the openings of the concavities 5A and 5B and their bottoms 12A and 12B. Namely, the bottoms of the concavities 5C and 5D formed at the side surfaces of the X-shaped torsion spring are those denoted by 12C and 12D. As described above, with these four concavities 5A, 5B, 5C and 5D, the section of torsion spring 3 is formed into an X-letter shape.

The width Wg of the opening of the concavities 5A and 5B is formed relative to the thickness t of the torsion spring (supporting base plate), in the following dimensional range.

$$Wg < t/\tan 54.7° \tag{1}$$

By satisfying the relationship of equation (1), the concavities 5A and 5B do not extend throughout the material to form a single throughbore, and an X-shaped torsion spring can be provided. The surface of each concavity formed in the torsion spring is comprised of a (111)-equivalent surface (namely, {111}-surface) of the monocrystal silicon.

It should be noted that, in FIG. 1, the concavities 5A and 5B of the torsion spring are formed from the junction between the supporting base plate 2 and the torsion spring 3 and the junction between the movable member 6 and the torsion spring 3. However, the position of the concavities may be slightly shifted toward to the central portion side of the torsion spring from the respective junctions. By shifting the position of the concavity as described above, stress concentration to the respective junctions can be avoided.

Figure 4:
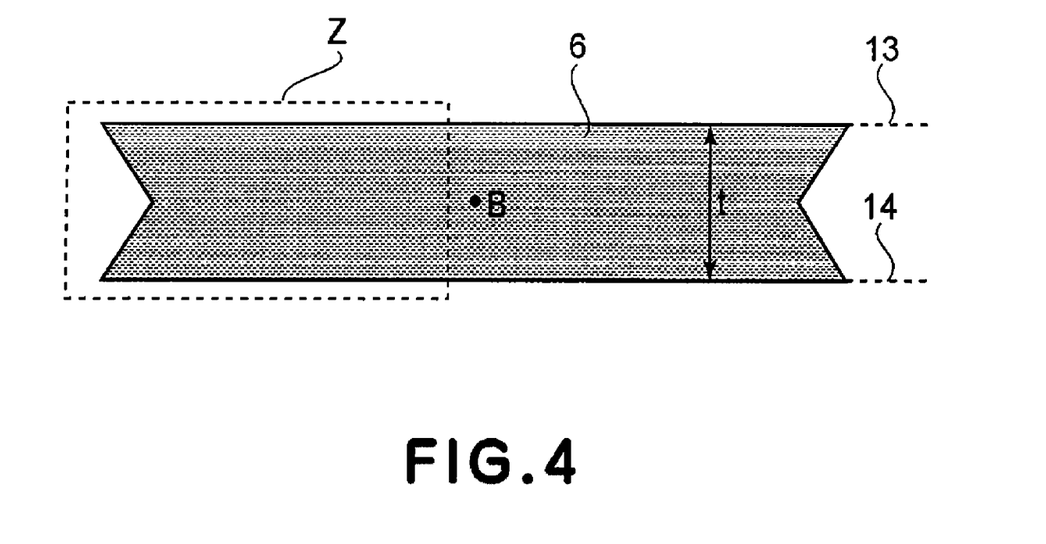
FIG. 4 is a sectional view showing a movable member of the present invention.

On the other hand, FIG. 4 is a sectional view of the movable member 6 taken on a line C-C' of FIG. 1. The movable member 6 has a front surface 13 and a rear face 14 as illustrated. Furthermore, the front surface 13 and the rear face 14 are coplanar with the top surface 10 and the bottom surface 11 of the torsion spring 3, respectively. In the present embodiment, the size in the direction of the front surface 13 (namely, top surface 10) and the rear surface 14 (namely, bottom surface 14) is taken as the thickness t of the substrate. In other words, the thickness of the supporting base plate 2, torsion spring 3 and movable member 6 is the same as the thickness t of the substrate.

The oscillator device of the present embodiment has a natural oscillation mode of torsional oscillation about the torsion axis B. The frequency f thereof can be expressed by the following equation.

$$f = 1/(2 \cdot \pi) \cdot \sqrt{(2 \cdot K/I)} \tag{2}$$

Here, K is the torsion spring constant of one torsion spring 3 about the torsion axis B, and I is the inertia moment of the movable member 6 about the torsion axis B. The frequency f of the natural oscillation mode such as above, if as an example the driving frequency is made approximately equal to it as in an application of an optical deflector to be described later, can realize electric-power-saving driving. Thus, since the frequency f determines the driving frequency, it is desirable that the manufacture dispersion of the frequency f is small.

If, however, the thickness t of the substrate has an error, it leads to an error in the thickness of the movable member 6 itself and the inertia moment cannot have an exact value.

As described earlier, I is the inertia moment of the movable member 6 around the torsion axis B. Therefore, if the distance between the fine portion dm of movable member 6 and the torsion axis B is denoted by r, the inertia moment I of the movable member can be presented by the following equation.

$$I = \int_V r^2 dm \tag{3}$$

Here, V of equation (3) represents the integration throughout the whole shape of the movable member 6. Thus, if the substrate thickness t has an error, the thickness of the movable member 6 itself deviates from the thickness t, and the inertia moment cannot have an exact value. Here, the presumed thickness of the substrate comprising is denoted by $t_0$, the thickness of the substrate having an error is denoted by $t_1$, and the thickness error "$t_1 - t_0$" of the substrate is denoted by $\Delta t$. Furthermore, $I_0$ is the inertia moment at the presumed thickness $t_0$. Since V of equation (3) varies with the thickness error, an error occurs in the inertia moment as well. The inertia moment having an error occurred therein is denoted by $I_r$. Here, the inertia moment error "$I_r - I_0$" is denoted by $\Delta I$. Then, the rate of change $\alpha_i$ of the inertia moment to the thickness error (i.e., the thickness error coefficient of the inertia moment of the movable member 6) is given by the following equation.

$$\alpha_i = (\Delta I/I_0)/(\Delta t/t_0) \tag{4}$$

Namely, $\alpha_i$ is the coefficient that represents how much the inertia moment of the movable member changes when the substrate has a thickness error $\Delta t$.

Thus, from equation (4), it follows that the inertia moment $I_r$ including the error is expressed by $$I_r = I_0(1 + \alpha_i \cdot (\Delta t/t_0)) \tag{5}$$

On the other hand, with regard to the torsion spring 3 as well, if the substrate thickness t has an error, the torsion spring constant K around the torsion axis B will be a torsion spring constant $K_r$ such as represented by equation (6) below.

$$K_t=K(1+\alpha_k\cdot(\Delta t/t)) \quad (6)$$

Here, $\alpha_k$ of equation (6) is called a thickness error coefficient of the torsion spring constant of torsion spring 3. It is a coefficient that represents how much the torsion spring constant of the torsion spring changes when the substrate has a thickness error $\Delta t$.

In the oscillator device of the present invention, the thickness error coefficient $\alpha_k$ of the torsion spring constant is made be approximately equal to $\alpha_i$ and, by doing so, the error of the frequency f which is determined by the ratio of the torsion spring constant K and the inertia moment I can be reduced. More specifically, if $I_t$ of equation (5) and $K_t$ of equation (6) are substituted into K and I of equation (2), K/I of equation (2) will be rewritten as $$K(1+\alpha_k\cdot(\Delta t/t))/I_0(1+\alpha_i\cdot(\Delta t/t)).$$

Therefore, by making $\alpha_k$ and $\alpha_i$ approximately equal to each other, $1+\alpha_k\cdot(\Delta t/t)$ and $1+\alpha_i\cdot(\Delta t/t)$ can be made approximately equal to each other. Thus, the influence of the thickness error of the wafer to the value of $K(1+\alpha_k\cdot(\Delta t/t))/I_0(1+\alpha_i\cdot(\Delta t/t))$ can be reduced.

Now, the method how the thickness error coefficient $\alpha_k$ of the torsion spring constant can be made approximately equal to the thickness error coefficient $\alpha_i$ of the inertia moment, in the present invention, will be explained.

First of all, with regard to the torsion spring constant K of the torsion spring 3, if the modulus of transverse elasticity of the torsion spring 3 is denoted by G and the length of the torsion spring 3 is denoted by Ls, there is a relationship as follows.

$$K=J\cdot G/Ls \quad (7)$$

Here, the coefficient represented by J is called a torsion coefficient. This torsion coefficient J is a value which is determined by the shearing stress generated in accordance with the cross-sectional shape of the torsional state, and also it is a value which depends on the cross-sectional shape of the torsion spring. For example, if the cross-sectional area of the torsion spring is circular, then it is the polar moment of inertia of area. On the other hand, in the case of an ordinary cross-sectional shape, it can be obtained from the relationship with the torque based on integrating the shearing stress being distributed throughout the section. Thus, once the cross-sectional shape is determined, the torsional coefficient J can be calculated precisely in accordance with numerical analysis using the finite element method, for example. In the present embodiment, the torsional coefficient of the structure having an X-shaped section with individual L1/L2 is calculated based on the numerical analysis.

As seen in equation (7), among the parameters J, G and Ls which determine K, the parameter which varies with the thickness of the substrate is only J which is a parameter depending on the cross-sectional shape. Thus, the thickness error coefficient $\alpha_k$ of the torsion spring constant is equal to the rate of change of the torsion coefficient J to the thickness (namely, the thickness error coefficient of the torsion coefficient). The torsional coefficient J is determined by how the section varies from the presumed thickness $t_0$, with the thickness error.

Now, the shape error caused by an error from the presumed thickness $t_0$ will be considered and, to this end, the method of producing a torsion axis having an X-shaped cross-section as well as a movable member will be explained. FIG. 5 and FIG. 6 are sectional views showing the method of producing the X-shaped section of the torsion spring 3 as well as the movable member 6. In the oscillator device of the present embodiment, the X-shaped section of the torsion spring 3 and the movable member 6 are produced from a single silicon wafer 100 through a single etching process.

Figure 5A:
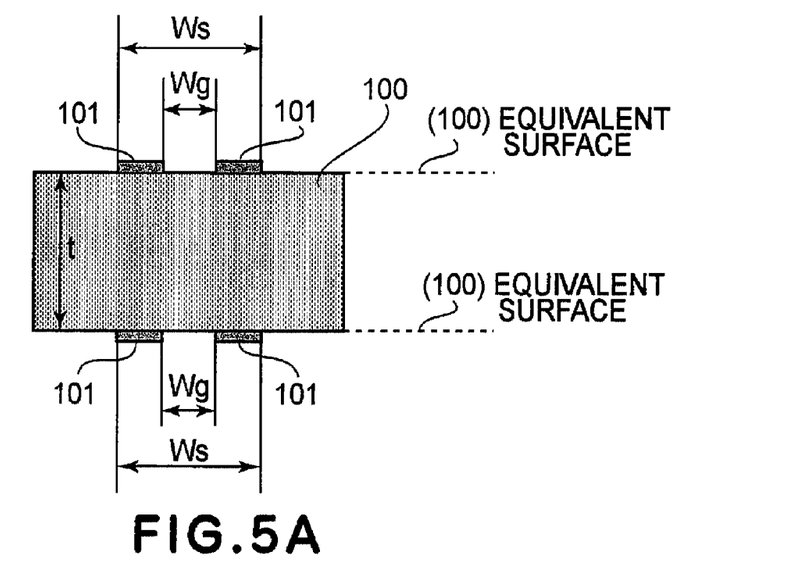
FIGS. 5A, 5B and 5C are sectional views, respectively, illustrating a torsion spring production method according to the present invention.
Figure 5B:
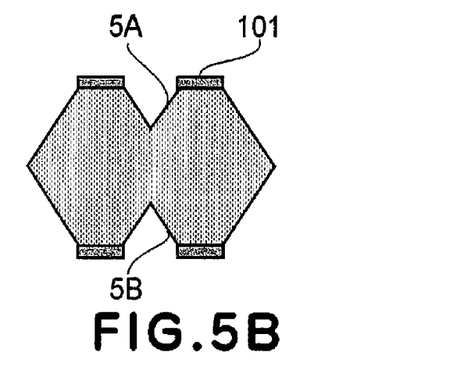
Figure 5C:
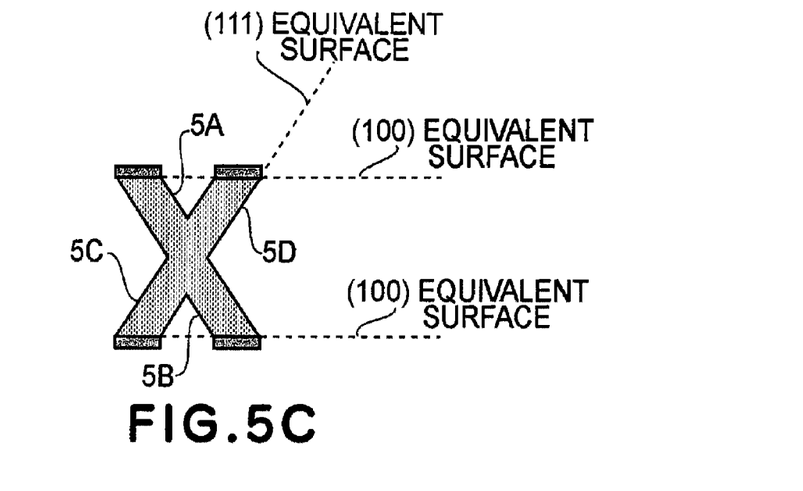

FIGS. 5A-5C illustrate the process of making the section of the torsion spring 3 shown in FIG. 2. First of all, as shown in FIG. 5A, etching mask portions 101 are formed on the both sides of the silicon wafer 100 having a crystal orientation <100>. For example, silicon nitride films may be formed on the top and bottom surfaces of the silicon wafer, respectively and, by dry-etching the same, the etching mask portions can be produced. The size Wg of etching mask portions 101 satisfies the relationship of equation (1) mentioned hereinbefore. By setting the sizes Wg and Ws at appropriate values relative to the wafer of thickness t, a desired value of L1/L2 is obtainable. Furthermore, the position of the top surface 10 and the bottom surface 11 is at the (100)-equivalent surface of the silicon wafer, while the slant surface of the X shape is a (111)-equivalent surface. Forming the cross-sectional shape based on the (111)-equivalence surface is advantageous in that the shape can be formed precisely by the anisotropic etching.

Subsequently, the crystal anisotropy etching of silicon is carried out. With regard to the etchant, a potassium hydroxide water solution can be used. In the etching process, since the etching rate depends on the crystal orientation, as the etching progresses, concavities 5A and 5B are formed as shown in FIG. 5B. As the etching progresses furthermore, concavities 5C and 5D are formed as shown in FIG. 5C and then the etching process is completed. As described above, a torsion spring 3 of X-shape having concavities 5A, 5B, 5C and 5D shown in FIG. 5C can be produced from a single silicon wafer 100 through a single etching process.

Figure 6A:
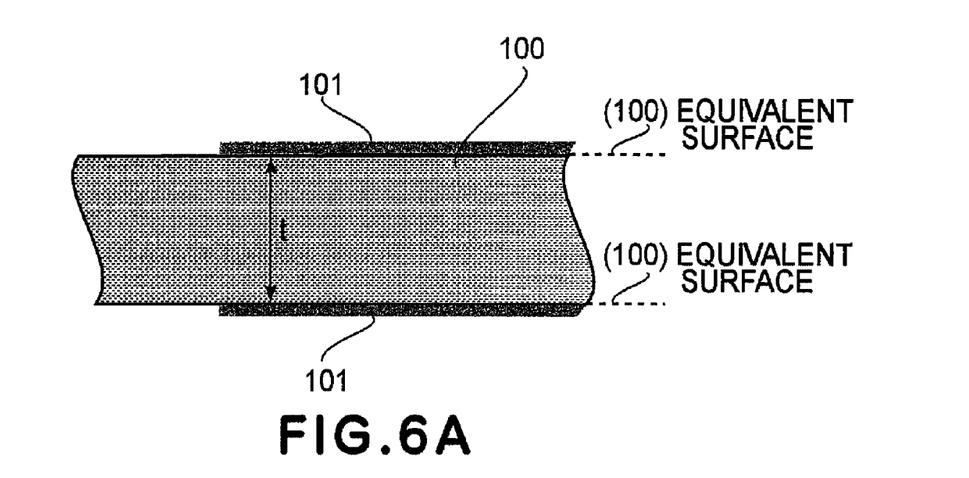
FIGS. 6A, 6B and 6C are sectional views, respectively, illustrating a movable member production method according to the present invention.
Figure 6B:
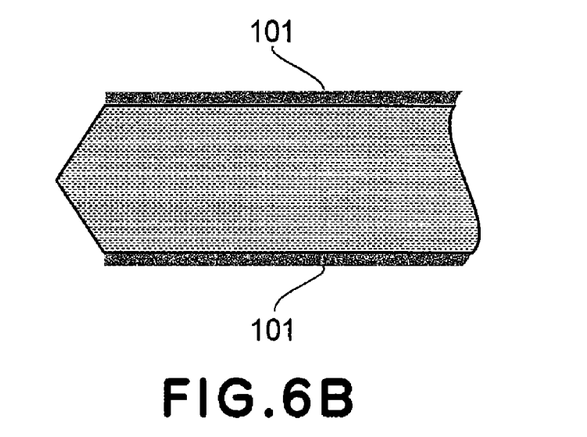
Figure 6C:
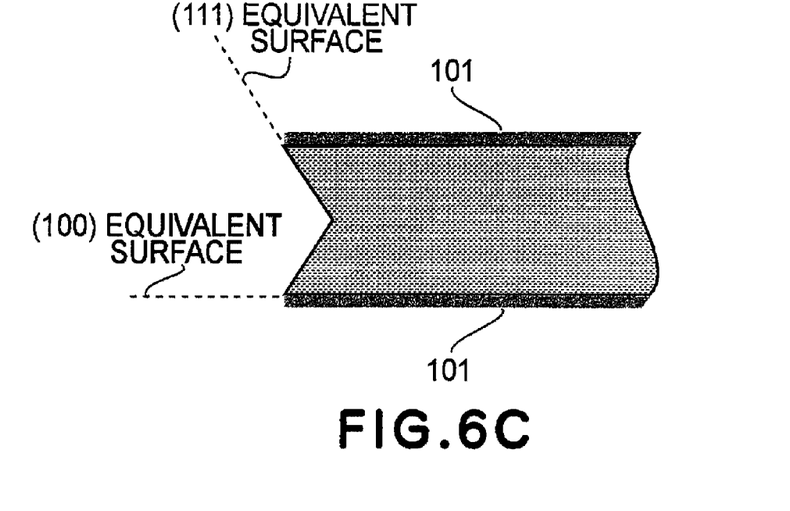

FIGS. 6A-6C illustrate the process of etching the movable member 6 as the anisotropic etching of silicon is carried out. FIGS. 6A-6C illustrate a Z region which is surrounded by a broken line in FIG. 4. As shown in FIG. 6C, in the movable member 6 as well, the side surface is a (111)-equivalence surface. Hence, there is an advantage that the shape can be formed precisely by the anisotropic etching.

Furthermore, with the use of a single silicon wafer having no cemented interface, a movable member in which the internal friction of the material when the oscillator device produces torsional oscillation is small while the Q-value of oscillation of the oscillation mode is large, is accomplished. Furthermore, since the oscillator device according to the present embodiment has no cemented interface, there is no possibility of damage at the cemented interface.

If the thickness t of the substrate has an error from the presumed thickness $t_0$, although the sizes Wg and Ws are not affected thereby, the distances L1 and L2 of the bottoms 12A, 12B, 12C and 12D of the finished concavities are influenced thereby. As a result, the X-shaped section changes in the following manner. That is, if the thickness t becomes larger than the presumed thickness $t_0$, L1 becomes large while L2 becomes smaller. On the contrary, if the thickness t becomes smaller than the presumed thickness $t_0$, L1 is becomes smaller and L2 becomes larger. This is for the following reason: since the torsion spring 3 has a shape based on the (111)-equivalent surface of the silicon crystal plane of s single wafer, although the depth of the concavities 5A and 5B is unchangeable relative to the error of the thickness, the depth of the concavities 5C and 5D are changeable. Thus, the change in section of the torsion spring 3 can be expressed using the value of L1/L2. Then, the thickness error coefficient $\alpha_k$ of the torsion spring constant K of the torsion spring 3 with a parameter L1/L2 can be depicted as illustrated in FIG. 7.

Figure 7:
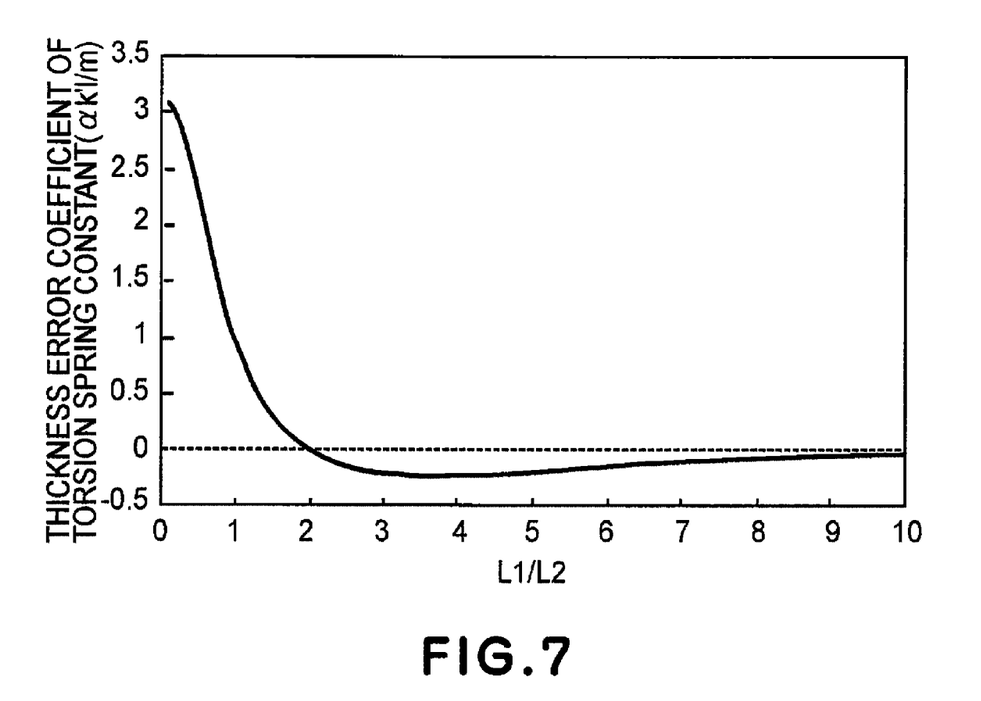
FIG. 7 is a graph showing the relationship between L1/L2 and the thickness error coefficient of the torsion spring constant, in the present invention.

The curve in FIG. 7 was obtained by calculating through numerical analysis and plotting the rate of change of the torsion coefficient J relative to the thickness, with respect to individual values of L1/L2 (the rate of change ΔJ/J of the torsional coefficient relative to Δt/t), more specifically, the thickness error coefficient $\alpha_k$ of the torsion spring constant. Namely, $\alpha_k$ is a value obtained by partially differentiating the function of the torsional coefficient J to L1/L2, with respect to the thickness t.

In the curve of FIG. 7, when L1/L2 is approximately equal to 2, $\alpha_k$ is zero. Within the region in which L1/L2 is not greater than 2, $\alpha_k$ can have various positive values. On the other hand, in the region where L1/L2 is not less than 2, $\alpha_k$ can have a negative value.

Figure 8:
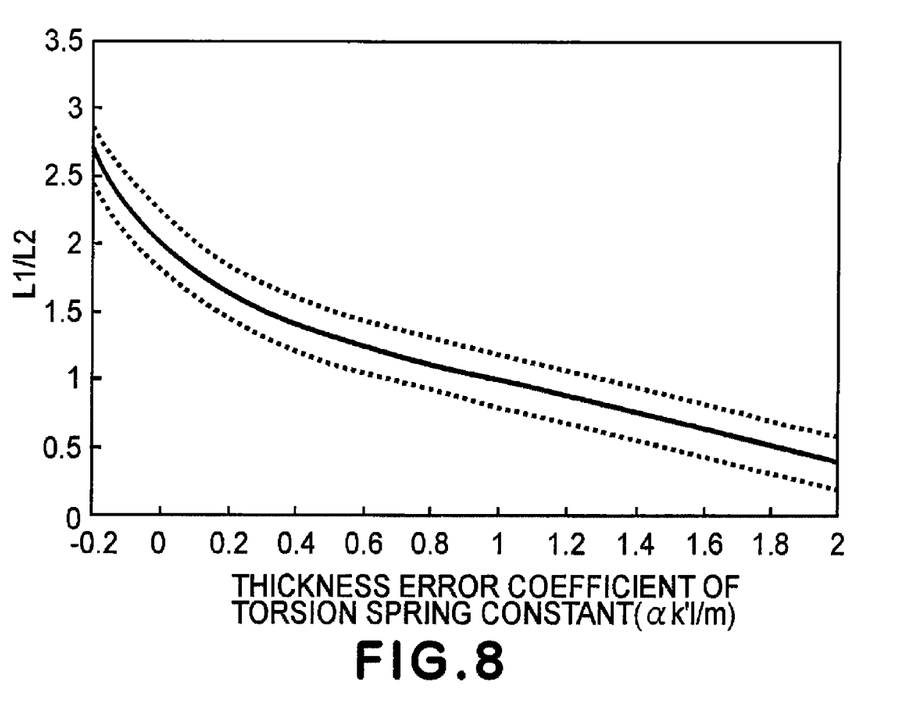
FIG. 8 is a graph showing the relationship between the thickness error coefficient of the torsion spring constant and L1/L2, in the present invention.

FIG. 8 is a graph wherein the relationship of parameters in FIG. 7 is reversed, such that the axis of abscissas depicts the thickness error coefficient $\alpha_k$ of the torsion spring constant while the axis of ordinate depicts L1/L2. In the curve of FIG. 8, the fitting can be done based on the arithmetic expression as follows.

$$L1/L2 = C1 \cdot \text{Exp}\{C2 \cdot (\alpha_k + C3)\} + C4 \cdot \alpha_k + C5 \quad (8)$$

Here, C1, C2, C3, C4 and C5 are as follows.

$C1 = 5.0 * 10^{-1}$ $C2 = -4.4$ $C3 = 4.6 * 10^{-2}$ $C4 = -6.0 * 10^{-1}$ $C5 = 1.6$

Thus, L1/L2 which becomes equal to the thickness error coefficient $\alpha_i$ of the inertia moment of the movable member 6 can be determined from equation (8).

Hence, the change of the spring constant of the torsion spring 3 due to the wafer thickness error and the change of the inertia moment of the movable member 6 resulting from the wafer thickness error can be made approximately equal to each other. Therefore, the error of frequency f of the oscillation mode can be lowered.

It should be noted that, in FIG. 8, it is possible that an error occurs in the value of the thickness error coefficient $\alpha_k$ of the torsion spring constant relative to L1/L2. For example, if an error of 10% occurs in the thickness error coefficient of the inertia moment when a wafer of 200 μm is used, the numerical value range of C5 in equation (8) is 1.5<C5<1.7. This range corresponds to the region as depicted by broken lines in FIG. 8.

This range of C5 is a value being applicable even to a wafer having a thickness other than 200 μm. However, for reduced deformation of the movable member during the oscillation, the thickness of the movable member s should preferably be not less than 200 μm.

Figure 9:
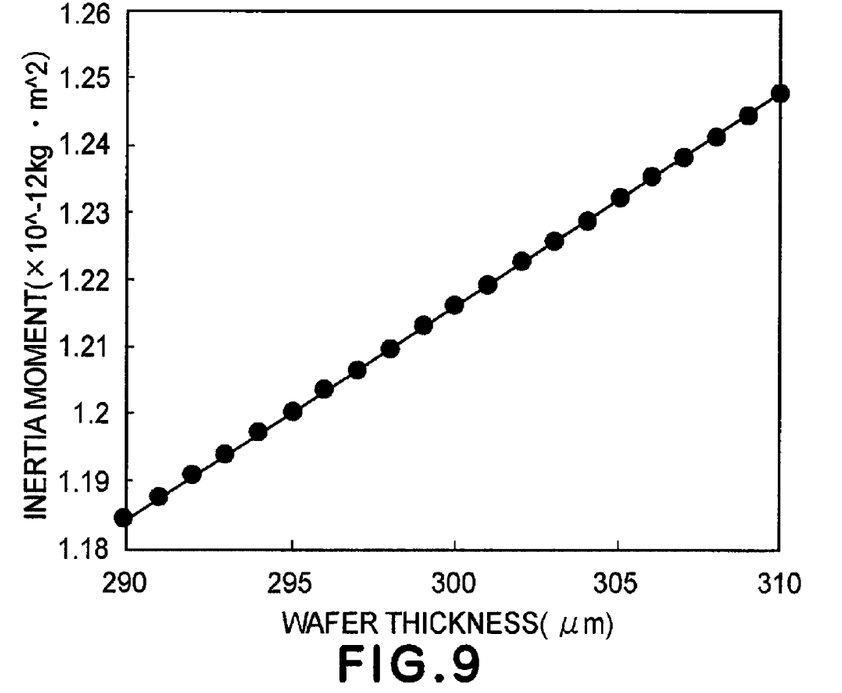
FIG. 9 is a graph showing the change of the inertia moment in a case where a wafer of a thickness 300±10 μm is used.

Next, an example wherein, with regard to the movable member 6 of the oscillator device shown in FIG. 1, the presumed wafer thickness is 300 μm, the length in the direction of the torsion axis B is 0.8 mm, and the width is 3.2 mm, will be explained. Here, the presumed inertia moment $I_0$ of the movable member 6 is $1.216*10^{-12}$ kg·m^2. Now, a case where the thickness 300 μm has an error of ±10 μm is considered. The change of the inertia moment in that occasion will such as shown in FIG. 9. It is seen from this graph that, within the range of the thickness error, the change of the inertia moment is presented by a linear function. From the tilt as depicted by the linear function of FIG. 9 as well as the presumed thickness $t_0 = 300$ μm and presumed inertia moment $I_0 = 1.216*10^{-12}$ kg·m^2 and in accordance with equation (4), it follows that the thickness error coefficient $\alpha_i$ of the inertia moment is 0.780. Here, $\alpha_i$ is the quantity as determined by the structure of the movable member 6. It can have various values when the width or length of the movable member 6 changes or another component is provided on the movable member 6, for example.

Figure 10:
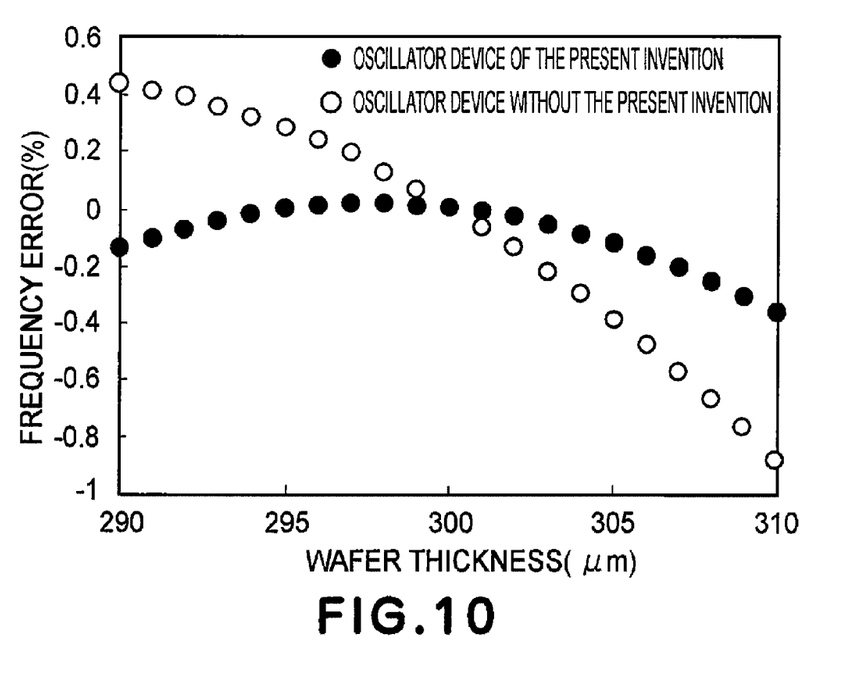
FIG. 10 is a graph showing the relationship between the substrate thickness and the frequency error, in the first embodiment of the present invention.

Then, from equation (8), L1/L2 of the torsion spring 3 is determined, which is 1.13. Here, Wg, Ws and Ls of the torsion spring 3 are 152 μm, 288 μm and 5500 μm, respectively. In the oscillator device of the present embodiment, the presumed frequency of the natural oscillation mode is 4.54 kHz. FIG. 10 illustrates the error of the frequency of the natural oscillation mode when an error occurred in the wafer thickness of the oscillator device of the present embodiment. Furthermore, for comparison, as an example of an oscillator device having been constructed without the present invention, a frequency error in a case of L1/L2=1.41 (Wg=144 μm, Ws=281 μm, and Ls=5500 μm) is illustrated there. In the oscillator device of the present embodiment, the frequency error has a variation width of 0.39%. On the other hand, in the oscillator device constructed without the present invention (L1/L2=1.41), it is 1.39%. Thus, by setting L1/L2 at a value suitable for the movable member 6 as in the oscillator device of the present embodiment, the frequency error of the error natural oscillation mode relative to the wafer thickness can be reduced significantly. Furthermore, since there is no necessity of making the thickness of the substrate precisely even, the oscillator device can be manufactured relatively inexpensively.

Furthermore, when the oscillator device according to the present embodiment is used as an optical deflector, aluminum may be vapor-deposited on the surface 13 of the movable member 6 to provide a reflection surface (not shown) there. Here, an excitation means comprised of a PZT piezoelectric member (not shown) may be connected to the supporting base plate 2 as a driving means, and minute oscillation about the frequency of the natural oscillation mode around the torsion axis B of the oscillator device may be applied to the supporting base plate 2. By doing so, the movable member 6 can be oscillated about the torsion axis B at a large displacement angle. Thus, it functions as an optical deflector for scanning the light.

Second Embodiment

Figure 11A:
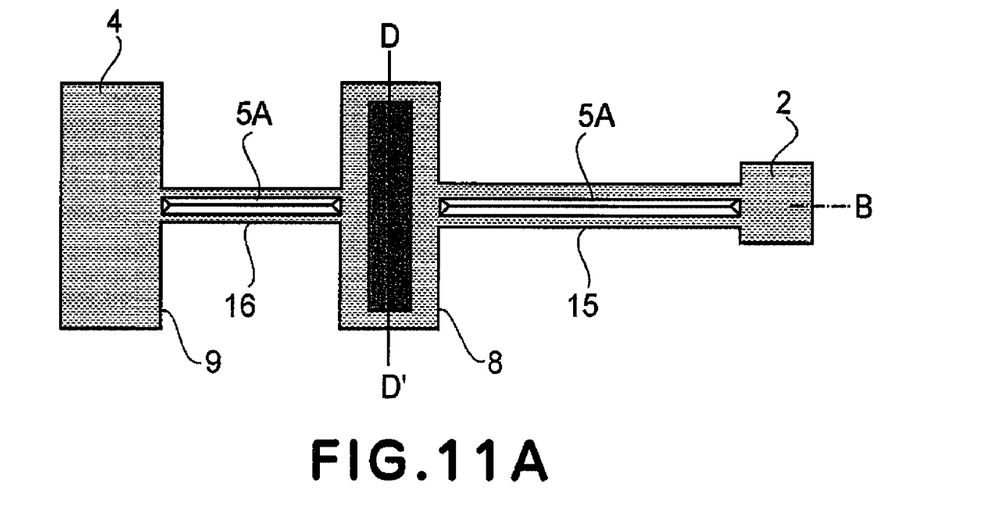
FIG. 11A is a top plan view showing an oscillator device according to a second embodiment of the present invention.
Figure 11B:
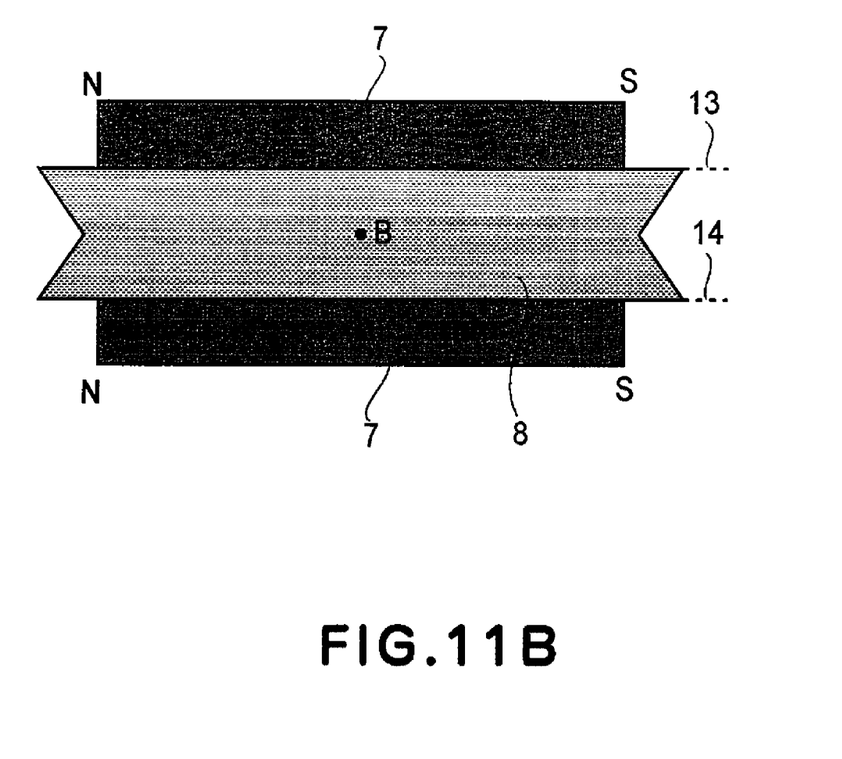
FIG. 11B is a sectional view of a movable member of the oscillator device according to the second embodiment of the present invention.

FIG. 11A and FIG. 11B are diagrams showing an oscillator device according to a second embodiment of the present invention.

FIG. 11A is a top plan view of the oscillator device, and FIG. 11B is a sectional view taken on a line D-D'. In FIGS. 11A and 11B, components corresponding to those of FIG. 1 are denoted by like numerals. As shown in FIG. 11A, in the oscillator device of the second embodiment, a first movable member 8 is supported by a first torsion spring 15, for torsional oscillation relative to a supporting base plate 2 about a torsion axis B. Then, the second movable member 9 is supported by a second torsion spring 16, for torsional oscillation relative to the first movable member 8 about the torsion axis B. Here, the first movable member 8, first torsion spring 15, second movable member 9 and second torsion spring 16 are referred to as a movable system.

As described above, the movable system of the oscillator device of the second embodiment constitutes a two-degree-of-freedom oscillation system in terms of the torsional oscillation about the torsion axis B. Then, around the torsion axis B, it has a reference oscillation mode which is a natural oscillation mode having a reference frequency and a secondary oscillation mode having a frequency approximately two-fold of the reference frequency. It should be noted that, in the present invention, the approximately twofold means a range from 1.98 to 2.02. The spring constants (K1 and K2) of the first torsion spring 15 and the second torsion spring 16 are so determined that the two oscillation modes mentioned above are provided relative to the inertia moments (I1 and I2) of the first movable member 8 and second movable member 9 about the torsion axis B. It should be noted that, although in the present embodiment the frequency of the secondary oscillation mode is made approximately twofold the frequency of the reference oscillation mode, any value may be used if it is an approximately integral-number multiple. This value can be changed depending on the oscillation. In the present invention, the term "approximately integral-number multiple" refers to a multiple from 0.98 n to 1.02 n where n is an integer not less than 2.

FIG. 11B is a sectional view of the first movable member 8 taken along a line D-D' in FIG. 11A. The first movable member 8 is provided with permanent magnets 7 having magnetic poles in the direction as illustrated as driving means, the magnets being fixed by adhesion to the top surface 13 and the bottom surface 14 thereof, respectively. A torque is generated by an alternating magnetic field which is produced by applying an alternating current to an electric coil, not shown. With this torque, the two oscillation modes mentioned above are excited at the same time. By exciting the two components having a twofold relationship at an appropriate amplitude ratio and phase difference as described above, the change of the scan angle with respect to time can have an approximately sawtooth-wave shape, rather than a sinusoidal wave shape. Hence, the angular speed of the scan can be made approximately constant.

Furthermore, if a reflection surface 4 is formed on the second movable member of the oscillator device of the present embodiment, it can function as an optical deflector.

The oscillator device of the present embodiment is produced in accordance with the manufacturing process shown in FIGS. 5 and 6 having been explained with reference to the first embodiment. Here, a first torsion spring 15 and a second torsion spring 16 have an X-shaped section with concavities 12A, 12B, 12C and 12D as shown in FIG. 2. However, the size of Wg and Ws of the first and second torsion springs 15 and 16 are different. The distance connecting the bottoms of the concavities 12A and 12B of the first and second torsion springs 15 and 16 and the distance connecting the bottoms of the concavities 12C and 12D are denoted by L1 and L2 (for the first torsion spring 15) and M1 and M2 (for the second torsion spring), respectively.

In the present embodiment as well, with the use of a single silicon wafer having no cemented interface, a movable member in which the internal friction of material as the oscillator device produces torsional oscillation is small while the oscillatory Q-value of the oscillation mode is large, is accomplished. Furthermore, since the oscillator device of the present embodiment has no cemented interface, there is no possibility of damage at the cemented interface.

In this embodiment, L1/L2 and M1/M2 of the distance L1, distance L2, distance M1 and distance M2 have values determined in accordance with the relationship to be described below and, based on this, both of the frequencies of the two oscillation modes of the oscillator device less change with the error of the substrate thickness t.

Now, the thickness error coefficients of inertia moment of the first movable member 8 and second movable member 9 are denoted by $\alpha_{i1}$ and $\alpha_{i2}$. Furthermore, the thickness error coefficients of torsion spring constant of the first torsion spring 15 and second torsion spring 16 are denoted by $\alpha_{k1}$ and $\alpha_{k2}$. Then, in the two-degree-of-freedom oscillation system constituted on the basis of the values of I1, I2, K1, K2, $\alpha_{i1}$, $\alpha_{i2}$, there exist $\alpha_{k1}$ and $\alpha_{k2}$ by which the drift of the frequencies of the two oscillation modes can be reduced. In the oscillator device of the present embodiment, based on the technique like the first embodiment (see equation (8)), L1/L2 and M1/M2 providing such values can be determined.

In the two-degree-of-freedom oscillation system constituted by I1, I2, K1 and K2, a mode matrix comprised of the amplitude and phase relationship of the oscillation mode is obtainable. Based on such mode matrix, coordinate transformation may be carried out to the practical coordinate system (in this embodiment, the displacement angles of the first movable member 8 and the second movable member 9 about the torsion axis B), whereby a primary mode coordinate system can be obtained. Then, even in a two-degree-of-freedom oscillation system, the two oscillation modes are not coupled each other and they can be expressed as two single-degree-of-freedom oscillation systems. Namely, in the primary mode coordinate system, if the inertia moment and torsion spring constant in the primary mode coordinate system are used, the frequencies of the two oscillation modes can be expressed in form of equation (2). In consideration of this, the thickness error coefficients $\alpha_{i1}$ and $\alpha_{i2}$ of inertia moment are introduced into the two single-degree-of-freedom oscillation systems in this coordinate system. Then, in the primary mode coordinate system of the two single-degree-of-freedom oscillation systems, $\alpha_{k1}$ and $\alpha_{k2}$ are determined so as to make the thickness error coefficients of the inertia moment and torsion spring constant equal to each other. Then, the following relationships are obtained.

$$\alpha_{k1}=Q1\cdot\alpha_{i1}+Q2\cdot\alpha_{i2} \quad (9)$$

$$\alpha_{k2}=Q2\cdot\alpha_{i1}+Q1\cdot\alpha_{i2} \quad (10)$$

$$Q1=(I2\cdot K1-I1\cdot K2)/\{I2\cdot K1-(I1+I2)\cdot K2\} \quad (11)$$

$$Q2=(I2\cdot K2)/\{(I1+I2)\cdot K2-I2\cdot K1\} \quad (12)$$

When $\alpha_{k1}$ and $\alpha_{k2}$ of equation (9) and equation (10) are used, L1/L2 and M1/M2 of the two torsion springs of the present embodiment will be as follows, based on equation (8).

$$L1/L2=C1\cdot\mathrm{Exp}\{C2\cdot(\alpha_{k1}-C3)\}+C4\cdot\alpha_{k1}+C5 \quad (13)$$

$$M1/M2=C1\cdot\mathrm{Exp}\{C2\cdot(\alpha_{k2}-C3)\}+C4\cdot\alpha_{k2}+C5 \quad (14)$$

$C1=5.0*10^\wedge-1$ $C2=-4.4$ $C3=4.6*10^\wedge-2$ $C4=-6.0*10^\wedge-1$ $C5=1.6$ Thus, L1/L2 and M1/M2 which are coincide with the thickness error coefficient $\alpha_{i1}$ of the inertia moment of the first movable member 8 and the thickness error coefficient $\alpha_{i2}$ of the inertia moment of the second movable member 9, can be determined from equation (13) and equation (14).

By use of the method as described above, the thickness error coefficients $\alpha_{k1}$ and $\alpha_{k2}$ of the first and second torsion spring constants as well as the thickness error coefficients $\alpha_{i1}$ and $\alpha_{i2}$ of the inertia moment of the first and the second movable members can be made equal to each other. As a result, in the present embodiment, the drift of frequency of the two oscillation modes due to the error of substrate thickness t can be reduced.

It should be noted that, in FIG. 8, it is possible that an error occurs in the value of the thickness error coefficient $\alpha_k$ of the torsion spring constant relative to L1/L2. For example, if an error of 10% occurs in the thickness error coefficient of the inertia moment when a wafer of 200 μm is used, the numerical value range of C5 in the aforementioned equation is 1.5<C5<1.7. This range corresponds to the region as depicted by broken lines in FIG. 8.

This range of C5 is a value being applicable even to a wafer having a thickness other than 200 μm. However, for reduced deformation of the movable member during the oscillation, the thickness of the movable member s should preferably be not less than 200 μm.

Next, an example where the oscillator device shown in FIG. 11 is made by use of a substrate having a presumed thickness of 300 μm, will be explained.

Figure 12:
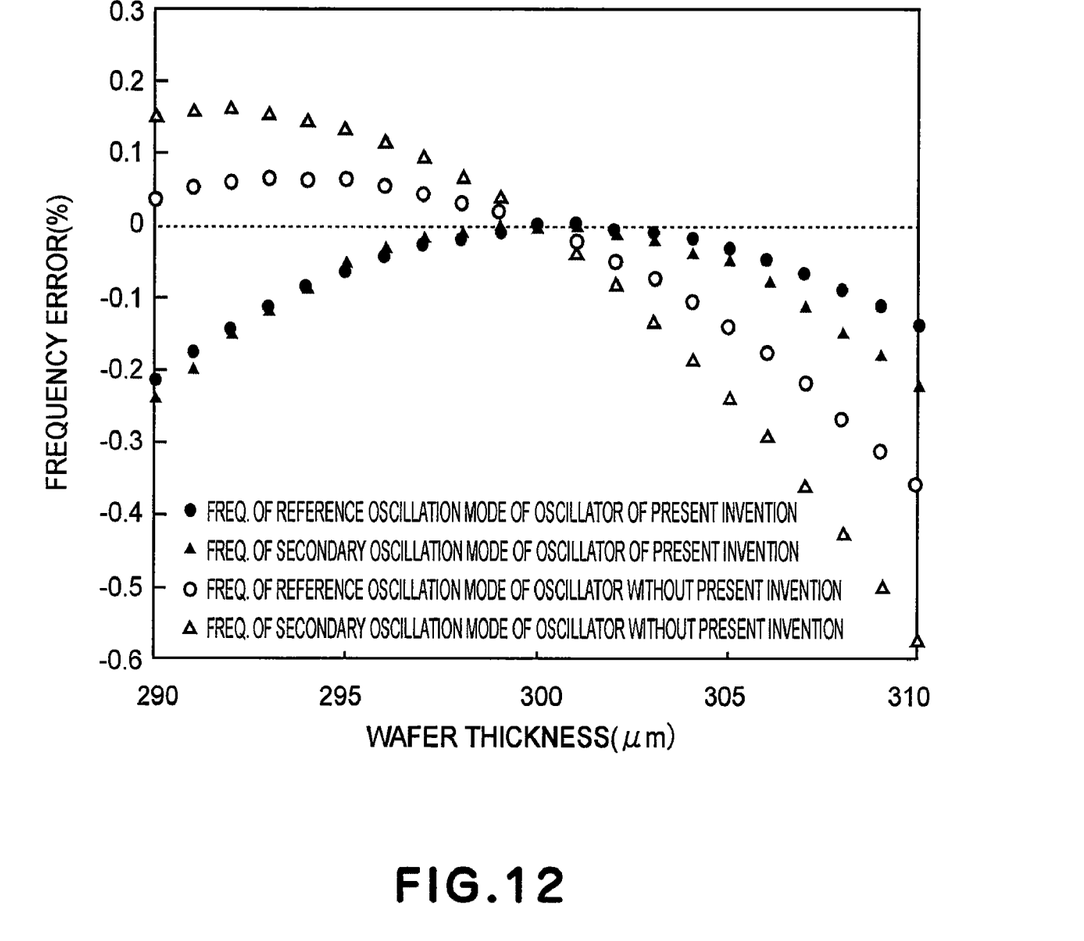
FIG. 12 is a graph showing the relationship between the substrate thickness and the frequency error, in the second embodiment of the present invention.

FIG. 12 illustrates, in terms of percentages, an error in the frequency of two oscillation modes when in an oscillator device of the present embodiment an error occurred in the substrate having a presumed thickness of 300 μm. In FIG. 12, black circles denote the reference oscillation mode where the present invention is applied. Black triangles denote errors in the secondary oscillation mode when the present invention is applied. Hollow denote errors of two oscillation modes when the present invention is not applied.

In accordance with the oscillator device of the present embodiment:

$$I1=4.781*10^-12 kg \cdot m^2$$

$$I2=1.217*10^-12 kg \cdot m^2$$

$$K1=1.401*10^-2 Nm/rad$$

$$K2=6.729*10^-3 Nm/rad$$

$$\alpha_{i1}=0.3553$$

$$\alpha_{i2}=0.7556$$

The cross-sectional shapes of the first torsion spring 15 and second torsion spring 16 are:

$$L1/L2=1.3$$

(here in the first torsion spring 15, Wg=106 μm and Ws=328 μm)

$$M1/M2=1.3$$

(here in the second torsion spring, Wg=143 μm and Ws=287 μm)

On the other hand, according to the hollow marks:

$$L1/L2=1.4$$

$$M1/M2=1.4$$

It is seen from the above that, in the oscillator device of the present embodiment, even if an error of ±10 μm occurs with respect to the presumed thickness 300 μm, the frequency of the two oscillation modes fluctuates only by ±0.1%. This shows that an exact frequency can be realized with an ordinary thickness error of widely available silicon wafers. Furthermore, since the rate of error of the two frequencies is approximately the same, the twofold relationship of the frequencies can be maintained. Furthermore, even if the thickness increases or decreases relative to the frequency of the presumed thickness, the frequency would fluctuates only toward the lower frequency side. Hence, the adjustment of the frequency error which occurred by the thickness can be carried out only on the basis of the method of reducing the inertia moment (that is, a method of shifting the frequency toward the higher frequency side). With regard to the method of reducing the inertia moment of the movable member, there is a method in which a tab for trimming is provided in a portion of the movable member and the tab is cut off by a laser beam, or a method in which a portion of the movable member is irradiated with a laser beam to vaporize a portion of the member of the movable member thereby to reduce the mass thereof.

In this embodiment as described above, by setting L1/L2 and M1/M2 at suitable values, it is assured that the frequencies of the two natural oscillation mode do not much depend on the thickness error, and thus the oscillator device can be manufactured stably. Furthermore, since the ratio of variations of two frequencies is approximately even, the integral-number multiple relationship is held stable without being much dependent on the thickness error. Additionally, since it is not necessary to precisely make the substrate thickness even, the oscillator device can be produced relatively inexpensively.

Generally, oscillator devices formed from silicon have a large Q-value, the peak at the frequency of the natural oscillation mode is sharp and the driving efficiency decreases if it deviates from this frequency. However, with use of the present invention, an oscillator device having a frequency of natural oscillation mode can be manufactured very precisely. Thus, in accordance with the present invention, an oscillator device which realizes wide scan with small electric power consumption can be accomplished.

Third Embodiment

Figure 13:
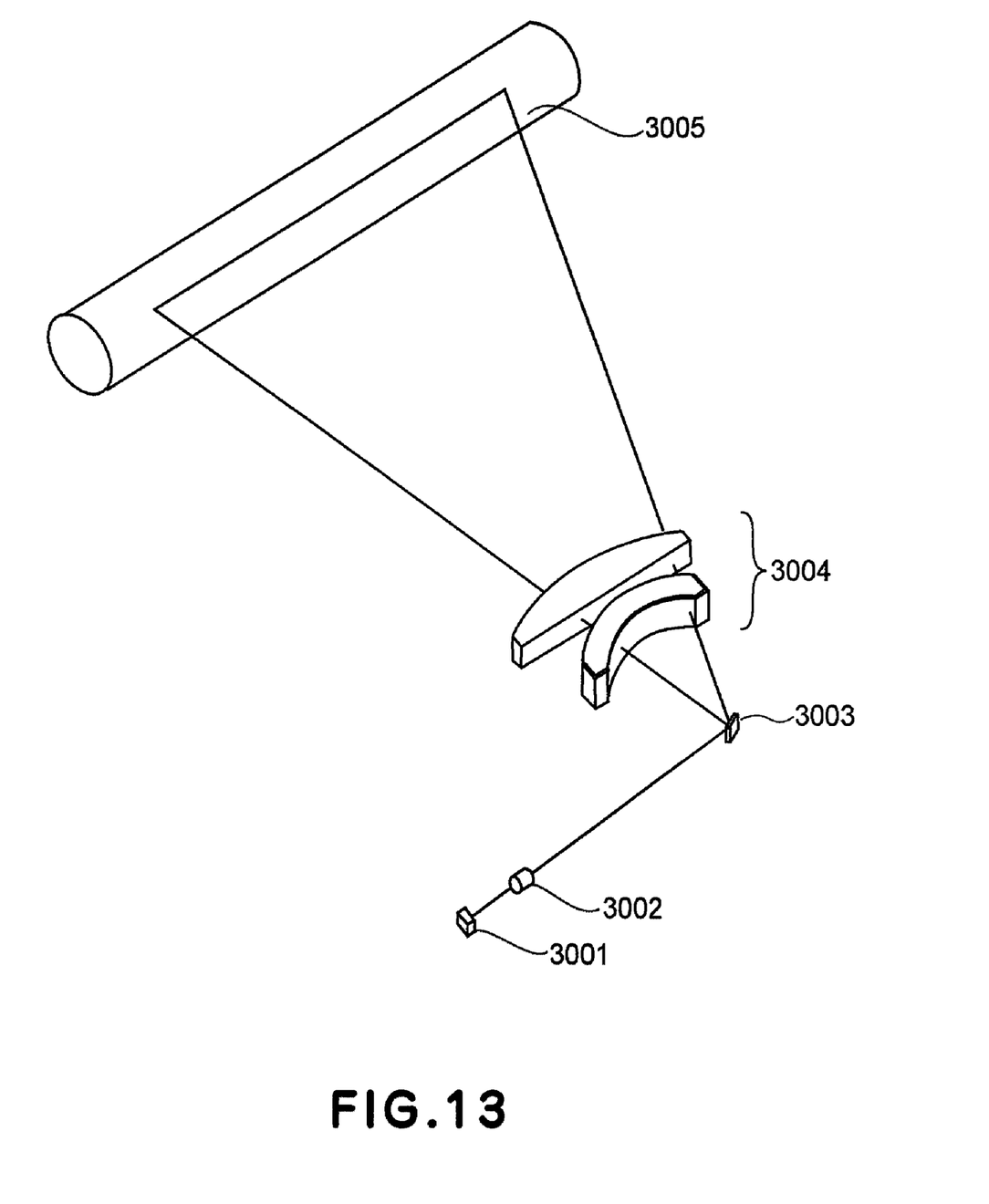
FIG. 13 is a perspective view showing an optical instrument according to a third embodiment of the present invention.

FIG. 13 is a perspective view showing an embodiment of an optical instrument using an optical deflector according to the present invention.

Here, an image forming apparatus is shown as the optical instrument. In FIG. 13, denoted at 3003 is an optical deflector of the present invention which is arranged, in the present embodiment, to scanningly deflect an incident light beam. Denoted at 3001 is a laser source. Denoted at 3002 is a lens or lens group. Denoted at 3004 is a writing lens or lens group. Denoted at 3005 is a photosensitive member.

The laser beam projected from the laser source 3001 undergoes predetermined intensity modulation related to the timing of the scanning deflection of the light. The intensity-modulated light goes through the lens or lens group 3002 and then it is scanningly deflected by the optical scanning system (optical deflector) 3003. By the function of the writing lens or lens group 3004, the thus scanned laser beam forms an image (electrostatic latent image) on the photosensitive member 3005.

The photosensitive member 3005 is rotating around the rotational axis extending at a right angle to the scan direction, and it is uniformly electrically charged by a charging device (not shown). Thus, when it is scanned with light, an electrostatic latent image is formed on the scanned portion. Subsequently, a toner image is formed on the image portion of the electrostatic latent image by means of a developing device (not shown). This toner image is transferred to a paper sheet (not shown) and fixed thereon, by which an image is produced on the paper sheet.

With the use of the optical deflector of the present invention in an image forming apparatus, a good quality image can be produced. Furthermore, when the optical deflector according to the second embodiment is used, the angular speed of the scanning deflection of the light can be made approximately constant angular speed on the photosensitive member 3005.

Thus, an image forming apparatus which can produces images having higher sharpness is accomplished.

An optical deflector which is comprised of an oscillator device of the present invention including a movable element with a reflection surface, driving means for applying a torque to at least one movable element to oscillate the same, and a damper member, When an optical deflector of the present invention is incorporated into a visual display unit such as a projection display, the following structure may be used. That is, the light beam from a light source is deflected by an optical deflector according to the present invention, and the deflected beam is projected on a member to be irradiated with light, by which an image is formed thereon. The optical deflector is configured to deflect the light beam in the main-scan direction on the member to be irradiated as well as in the sub-scan direction. Thus, the optical deflector of the present invention is applicable also to such optical instrument.

While the invention has been described with reference to the structures disclosed herein, it is not confined to the details set forth and this application is intended to cover such modifications or changes as may come within the purposes of the improvements or the scope of the following claims.

The invention claimed is:

1. An oscillator device, comprising:
   a supporting base plate;
   a torsion spring; and
   a movable member;
   wherein said movable member is supported by said torsion spring, for torsional oscillation relative to said supporting base plate about a torsional axis;
   wherein said torsion spring has an X-shaped section being perpendicular to said torsional axis and a top surface and a bottom surface each being defined by a (100)-equivalent surface of monocrystal silicon, and
   wherein a distance L1 connecting bottoms of concavities formed at the top surface and bottom surface, respectively, and a distance L2 connecting bottoms of concavities defined at side surfaces of the X-shaped torsion spring as well as a rate of change $\alpha_i$ of inertia moment of said movable member around the torsion axis, with a change of a thickness t of said supporting base plate, satisfy the following relation:

$L1/L2 = C1 \cdot \mathrm{Exp}\{C2 \cdot (\alpha_i + C3)\} + C4 \cdot \alpha_i + C5$ where $C1 = 5.0 * 10^{-1}$ $C2 = -4.4$ $C3 = 4.6 * 10^{-2}$ $C4 = -6.0 * 10^{-1}$ $1.5 < C5 < 1.7.$ 2. An oscillator device according to claim 1, wherein C5 is equal to 1.6.

3. An oscillator device according to claim 1, wherein said supporting base plate, said torsion spring, said movable member and said concavities are made from an integral monocrystal silicon material.

4. An oscillator device according to claim 1, wherein said concavities of said torsion spring have a surface defined by a (111)-equivalent surface.

5. An optical deflector, comprising:
   an oscillator device as recited in claim 1;
   a reflection surface formed on said movable member of said oscillator device, to reflect light; and
   a driving member configured to drive said movable member relative to said supporting base plate.

6. An oscillator device, comprising:
   a supporting base plate; and
   a movable system which includes (i) a first movable member, (ii) a first torsion spring configured to support said first movable member, for torsional oscillation relative to said supporting base plate about a torsion axis and at a first torsional spring constant (K1), (iii) a second movable member, and (iv) a second torsion spring configured to support said second movable member, for torsional oscillation relative to said first movable member about the torsion axis and at a second torsional spring constant (K2);
   wherein said movable system has a reference oscillation mode corresponding to a natural oscillation mode having a reference frequency, and a secondary oscillation mode corresponding to a natural oscillation mode of a frequency approximately n-fold the reference frequency, where n is an integer;
   wherein said first and second torsion springs have an X-shaped section being perpendicular to said torsional axis and a top surface and a bottom surface each being defined by a (100)-equivalent surface of monocrystal silicon, and
   wherein a distance L1 connecting bottoms of concavities formed at the top surface and bottom surface, respectively, of the first torsion spring, a distance L2 connecting bottoms of concavities defined at side surfaces of the X-shaped first torsion spring, a distance M1 connecting bottoms of concavities formed at the top surface and bottom surface, respectively, of the second torsion spring, and a distance M2 connecting bottoms of concavities defined at side surfaces of the X-shaped second torsion spring, as well as rates of change $\alpha_{i1}$ and $\alpha_{i2}$ of inertia moments I1 and I2 of said first and second movable members, respectively, with a change of a thickness t of said supporting base plate, satisfy the following relations:

$L1/L2 = C1 \cdot \mathrm{Exp}\{C2 \cdot (\alpha_{k1} + C3)\} + C4 \cdot \alpha_{k1} + C5$ $M1/M2 = C1 \cdot \mathrm{Exp}\{C2 \cdot (\alpha_{k2} + C3)\} + C4 \cdot \alpha_{k1} C5$ $\alpha_{k1} = Q1 \cdot \alpha_{i1} + Q2 \cdot \alpha_{i2}$ $\alpha_{k2} = Q2 \cdot \alpha_{i1} + Q1 \cdot \alpha_{i2}$ $Q1 = (I2 \cdot K1 - I1 \cdot K2)/\{I2 \cdot K1 - (I1 + I2) \cdot K2\}$ $Q2 = (I2 \cdot K2)/\{(I1 + I2) \cdot K2 - I2 \cdot K1\}$ where $C1 = 5.0 * 10^{-1}$ $C2 = -4.4$ $C3 = 4.6 * 10^{-2}$ $C4 = -6.0 * 10^{-1}$ $1.5 < C5 < 1.7.$ 7. An oscillator device according to claim 6, wherein C5 is equal to 1.6.

8. An oscillator device according to claim 6, wherein said supporting base plate, said first torsion spring, said second torsion spring, said first movable member, and said second movable member are made from an integral monocrystal silicon material.

9. An oscillator device according to claim 6, wherein said concavities of said first and second torsion springs have a surface defined by a (111)-equivalent surface.

10. An optical deflector, comprising:
an oscillator device as recited in claim 6;
a reflection surface formed on at least one of said first and second movable members of said oscillator device, to reflect light; and
a driving member configured to drive at least one of said first and second movable members relative to said supporting base plate;
wherein said movable system is oscillated simultaneously at the reference oscillation mode and the secondary oscillation mode.

11. An image forming apparatus, comprising:
a light source;
an optical deflector as recited in claim 5 or 10; and
a photosensitive member;
wherein said optical deflector is configured to deflect light from said light source to project at least a portion of the light onto said photosensitive member, to form an electrostatic latent image thereon.

12. An image display apparatus, comprising:
a light source; and
an optical deflector as recited in claim 5 or 10;
wherein said optical deflector is configured to deflect a light beam from said light source to project the light beam onto a member to be irradiated, to form an image thereon.

* * * * *